United States Patent [19]

Okajima et al.

[11] Patent Number: 5,279,717

[45] Date of Patent: Jan. 18, 1994

[54] PROCESS FOR REMOVING CHLORATE SALT FROM AQUEOUS ALKALI CHLORIDE SOLUTION

[75] Inventors: Kengo Okajima, Shinnanyo; Hiroyuki Wakamatsu, Tokuyama; Sadakatsu Kumoi, Hikari; Tsugio Murakami, Shinnanyo, all of Japan

[73] Assignee: Tosoh Corporation, Shinnanyo, Japan

[21] Appl. No.: 798,715

[22] Filed: Nov. 29, 1991

[30] Foreign Application Priority Data

Nov. 28, 1990 [JP] Japan ................... 2-322353
Nov. 12, 1991 [JP] Japan ................... 3-322413

[51] Int. Cl.$^5$ ............................................. C25B 1/46
[52] U.S. Cl. ........................................ 204/95; 204/98; 204/128; 204/182.4
[58] Field of Search ................. 204/95, 98, 128, 182.4

[56] References Cited

U.S. PATENT DOCUMENTS

| | | | |
|---|---|---|---|
| 3,520,787 | 7/1970 | Nystroem | 204/95 |
| 3,920,529 | 11/1975 | Sprague | 204/128 |
| 4,138,295 | 2/1979 | De Nora et al. | 204/98 |
| 4,169,773 | 10/1979 | Lai et al. | 204/98 |
| 4,230,544 | 10/1980 | McRae | 204/98 |
| 4,397,720 | 8/1983 | Moore et al. | 204/98 |
| 4,481,088 | 11/1984 | Moore et al. | 204/98 |
| 4,609,472 | 9/1986 | Reynolds et al. | 204/98 X |

FOREIGN PATENT DOCUMENTS 0098500 6/1983 European Pat. Off. .
54-28294 3/1979 Japan .

OTHER PUBLICATIONS

Patent Abstracts of Japan, vol. 13 No. 208 (C-596), May 16, 1989 and JP-A-01 025,992, (Toagosei Chem. Ind. Co.), Jan. 27, 1989 abstract.
World Patents Index, Derwent Publications Ltd., London, Great Britain, Accession No. 78-26000A, Week 14 and JP-A-53 018498 (Nippon Soda) Aug. 3, 1976.
World Patents Index, Derwent Publications Ltd., London, Great Britain, Accession No. 78-79127A, Week 44 and JP-A-53 110 998 (Toagosei Chem. Ind.), Sep. 28, 1978.
World Patents Index, Derwent Publications Ltd., London, Great Britain, Accession No. 83-02817K, Week 02 and JP-A-57 191 225 (Nippon Soda) Nov. 25, 1982.
Patent Abstracts of Japan, vol. 10, No. 280 (C-374), Sep. 24, 1986 and JP-A-61 101 402 (Tokuyama Soda Co.) May 20, 1986, abstract.

*Primary Examiner*—John Niebling
*Assistant Examiner*—Arun S. Phasge
*Attorney, Agent, or Firm*—Foley & Lardner

[57] ABSTRACT

The invention relates to processes for removing chlorate salts from an aqueous alkali chloride solution employed in cation-exchange membrane electrolysis, comprising the steps of adding hydrochloric acid to an aqueous alkali chloride solution to form a reaction solution, and maintaining the absolute pressure of the reaction solution at a range not higher than 600 mmHg and not lower than the saturated vapor pressure of the solution in a decomposition vessel and/or feeding the reaction solution to the bottom portion of a decomposition vessel and causing the reaction solution to flow upward in the decomposition vessel.

5 Claims, No Drawings

PROCESS FOR REMOVING CHLORATE SALT FROM AQUEOUS ALKALI CHLORIDE SOLUTION

BACKGROUND OF THE INVENTION

1. Field of the Invention

The present invention relates to a process for purifying an aqueous alkali chloride solution (hereinafter referred to as a "salt solution") for cation-exchange membrane electrolysis of alkali chloride. More specifically the present invention relates to a process for removing accumulated chlorate salts in a salt solution circulating in an electrolysis system.

2. Description of the Related Art

Several processes have been disclosed regarding the removal of chlorate salts from a salt solution. In a typical process, chlorate salts in a salt solution are decomposed by the addition of hydrochloric acid through the reactions shown below and removed therefrom.

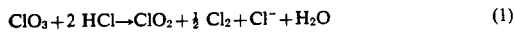

or

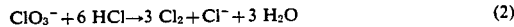

This process is disadvantageous because the reaction of hydrochloric acid with chlorate salts is slow and therefore, removal of the chlorate salts from the aqueous salt solution is a lengthy process.

Accordingly, further improvements have been disclosed for the quick removal of chlorate salts from a salt solution: for example, a method of saturating the salt solution with alkali chloride and subsequently adding hydrochloric acid (Japanese Patent Application Laid-Open No. Sho 59-20483); and a method of maintaining the concentration of hydrochloric acid in the salt solution at a level higher than 150 g/l (Japanese Patent Application Laid-Open No. Sho 57-191225). However, in the former method wherein a salt solution is saturated with an alkali chloride and hydrochloric acid is then added to the solution, problems are likely to be encountered as the result of the deposition of salts on the addition of hydrochloric acid. In the latter method wherein the hydrochloric acid concentration is maintained at a level higher than 150 g/l, the resulting hydrochloric acid concentration after decomposition of the chlorate salts is excessively high. Thus, these methods are disadvantageous because they require the posttreatment addition of chemicals as well as complicated post-treatment steps such as adding neutralizing alkali to lower the hydrochloric acid concentration and the treating salt deposits, respectively.

In a process within the present invention, chlorate salts in a salt solution are decomposed by the addition of a relatively small amount of hydrochloric acid with the resulting formation of chlorine dioxide as shown in Formula (1) above. Japanese Patent Application Laid-Open No. Sho 61-01402A discloses a method for recovering chlorine gas from chlorine dioxide formed in the decomposition and removal of chlorate salts in a salt solution in which the resulting chlorine dioxide is further decomposed into chlorine and oxygen by heating. This method, however, is disadvantageous because it requires the complicated steps of decomposing chlorine dioxide to produce chlorine and oxygen and then separating the two gases.

Another method for removing chlorate salts from a salt solution is disclosed in Japanese Patent Application Laid-Open No. Sho 56-163286. In this method, a catalyst layer is provided in a salt solution which is circulated via a pipeline which feeds the salt solution to an alkali chloride electrolysis cell of an membrane ion-exchanger. The chlorate salt is decomposed and then removed by introducing hydrogen or a hydrogen-containing gas. The problems associated with this method include an increase in impurities as a result of elution of the catalyst and an increase in cost due to the complexity of the process.

Still another method for removing chlorate salts from an aqueous salt solution is disclosed in Japanese Patent Application Laid-Open No. Sho 51-144399. In this method, aliquots of the circulating salt solution are removed and cooled in order to crystallize out and thereby isolate chlorate salt. The problems associated with this method include the relatively large amount of chlorate salt remaining in the salt solution, the complexity of the process, and the high cost of cooling.

In other known methods, chlorate salts are removed by the adding reducing agents such as sodium sulfite and hydrogen sulfide to the salt solution (Japanese Patent Application Laid-Open Nos. Sho 53-123396 and Sho 6077982) or by decomposing chlorate salts in acidic conditions in the presence of an ion-exchange membrane (Japanese Patent Application Laid-Open No. Sho 63-129015). Problems associated with these methods include, respectively, the accumulation of sulfate salts and the high cost of the chemicals employed, as well as inefficiency of the decomposition of chlorate salts and difficulty in implementing the process for industrial use.

After an extensive investigation of the known methods of decomposing chlorate salts in a salt solution, applicants discovered that chlorate salts are effectively and efficiently removed from a salt solution by adding hydrochloric acid to the salt solution and then maintaining the salt solution at a reduced pressure in a decomposition vessel and/or causing the hydrochloric-acid-containing salt solution to flow upward in the decomposition vessel.

SUMMARY OF THE INVENTION

It is therefore an object of the present invention to provide a process for removing chlorate salts from a salt solution by the use of hydrochloric acid, wherein the chlorate salts are rapidly decomposed using a small amount of hydrochloric acid, the salt solution is effectively and efficiently purified, and substantially pure chlorine gas is recovered.

In achieving this object, a process for removing chlorate salts from an aqueous alkali chloride solution employed in cation-exchange membrane electrolysis, comprising the steps of adding hydrochloric acid to the aqueous alkali chloride solution to prepare a reaction solution; maintaining the absolute pressure of said reaction solution at a range not higher than 600 mmHg and not lower than the saturated vapor pressure of said reaction solution contained in a decomposition vessel; and/or feeding said reaction solution through the bottom portion of said vessel; and causing said reaction solution to flow upward in said vessel.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

It has been discovered that chlorate salts in a salt solution can be decomposed and effectively and efficiently removed therefrom by processes requiring a lesser amount of hydrochloric acid than known processes. In particular, chlorate salts in a salt solution can be decomposed and effectively and efficiently removed therefrom by adding hydrochloric acid to the salt solution and then maintaining the resulting reaction solution at an absolute pressure ranging from not higher than 600 mmHg to the saturated vapor pressure of the reaction solution in a decomposition vessel. In an alternative process within the present invention, a process is provided for decomposing and removing chlorate salts from a salt solution by adding hydrochloric acid to the salt solution and then introducing the resulting reaction solution into the bottom portion of a decomposition vessel and then causing the reaction solution to flow upward in the decomposition vessel. The decomposition products formed from chlorate salts include alkali chloride and chlorine gas.

In the present invention the term "salt solution" means an aqueous solution of sodium chloride, potassium chloride, or the like. In addition, a salt solution within the present invention includes aqueous solutions of sodium chloride, potassium chloride, or the like, wherein the concentration of the salt is that typically employed for electrolysis, namely from about 150 g/l to about 300 g/l.

The efficiency of chlorate salt decomposition in a salt solution increases as greater amounts of hydrochloric acid are added to the salt solution. However, hydrochloric acid, when added in an excessively large amount, must be neutralized. Accordingly, a process within the present invention provides for the unexpectedly efficient decomposition of chlorate salts as lesser amounts of hydrochloric acid are preferably added. The amount of hydrochloric acid employed within the present invention ranges from about 10 to 50 moles, preferably from about 15 to 30 moles, per mole of chlorate salt in the salt solution. Hydrochloric acid may be added to the salt solution as gaseous hydrogen chloride.

In one aspect of the present invention, hydrochloric acid may be added to the salt solution by introduction via a pipeline employed for feeding the salt solution into a decomposition vessel or by direct addition into the decomposition vessel itself. Introduction via a pipeline is preferred due to the uniformity of the resulting reaction and ease of the operation.

The reaction solution, a mixture of the salt solution and hydrochloric acid, is preferably contained within a decomposition vessel, wherein absolute pressure is maintained in a range not higher than 600 mmHg and not lower than the saturated vapor pressure of the reaction solution. When the pressure is maintained within the prescribed range, there is an unexpected acceleration in the decomposition of chlorate salts in the salt solution. Decomposition of chlorate salts by hydrochloric acid proceeds less effectively at an absolute pressure higher than 600 mmHg and chlorine gas is not produced in the amount desired.

On the other hand, if the absolute pressure in the decomposition vessel is lower than the saturated vapor pressure of the reaction solution, a large amount of water vapor is produced which consumes a large amount of heat energy, and in addition, increases the water content of the resulting chlorine gas and necessitates separation of the chlorine gas from the water vapor. Furthermore, no significant effect on the rate of decomposition of chlorate salts is observed. Moreover, generation of water vapor consumes evaporation heat, lowers the reaction temperature and causes the reaction velocity to decrease. Accordingly, the desired result is only achieved by maintaining the pressure in the decomposition vessel within the range of the present invention. In a particularly preferred embodiment, pressure is maintained in a range not higher than 500 mmHg to not lower than 10 mmHg above the saturated vapor pressure of the reaction solution.

In this regard, the saturated vapor pressure depends on the kind of the salt solution, the chlorate salt concentration, and the species and concentration of impurities contained in the salt solution and should be measured via conventional techniques. For example, an aqueous sodium chloride solution at 90° C. has a saturated vapor pressure measuring approximately 470 mmHg at a concentration 150 g/l of NaCl; approximately 450 mmHg at 200 g/l; and approximately 420 mmHg at 250 g/l. The reduction of pressure in the decomposition vessel may be carried out by means of a vacuum pump, a water ejector, a steam ejector, or the like. The use of a warm-water ejector is particularly preferred since it allows the high-purity chlorine gas or liquefied chlorine formed as a byproduct of the decomposition reaction to be ejected as a liquid-gas mixture from the ejector into a tank. The liquid phase can then be recycled from the tank to the ejector while the gas phase is separated and dehydrated.

The type of the decomposition vessel used within the present invention is not particularly limited, and may, for example, be a tank- or columntype decomposition vessel. In a process within the present invention, a tank-type decomposition vessel is preferably stirred while a column-type vessel is preferably not stirred or filled with packing material. In order to minimize the reduction of chlorine dioxide, the height of the liquid layer in a decomposition vessel within the present invention is preferably not less than 1 m, more preferably not less than 2 m. Decomposition of chlorate salts may be conducted either by a continuous process or by a batch process; continuous processes being preferable in view of increased productivity and efficiency of operation.

In yet another aspect of the present invention, a process is provided wherein the reaction solution formed by adding hydrochloric acid to the salt solution is introduced into the bottom portion of a decomposition vessel and then the reaction solution is caused to flow upward in the vessel. According to this aspect of the present invention, hydrochloric acid may be added to the salt solution either via a pipeline feeding the salt solution to a decomposition vessel or by introducing the acid into the bottom portion of the decomposition vessel. In a preferred embodiment, hydrochloric acid is added into a pipeline which feeds the salt solution to the decomposition vessel, and more preferably the salt solution and the hydrochloric acid are mechanically mixed in the pipeline. This method provides a more uniform reaction and simplifies the operation. The reaction solution is then fed into the bottom portion of a decomposition vessel and caused to flow upward in the decomposition vessel, thereby accelerating decomposition of the chlorate salts in the salt solution.

The shape and the size of decomposition vessels within the present invention are not limited. In a preferred embodiment, a long column-type of vessel is employed. This type of vessel allows the reaction solution to flow roughly in a piston flow. The term, piston flow, means an ideal flow in which no mixing or diffusion of the flowing liquid occurs in the direction of the liquid flow and the liquid flow velocity is uniform in the plane perpendicular to the flow direction. By contrast, when a reaction solution flows downward, the efficiency of decomposition is extremely low, even if the reaction solution flows in a piston flow. This reduction in efficiency may be due to the fact that the actual residence time of the reaction solution is decreased owing to insufficient degassing of the chlorine formed and the subsequent reverse reaction which produces chlorine dioxide. Further, in the downward flow, the ratio of chlorine dioxide to chlorine gas becomes higher. While the decomposition vessel may be equipped with a stirrer, which requires increased equipment cost and expended energy for stirring, chlorate decomposition efficiency is not improved by stirring. Accordingly, no advantage is gained installing a stirrer.

In a preferred embodiment, the decomposition vessel is a long column-type vessel, wherein the inside diameter of the column is from about 0.03 to 3 m, and the liquid height is from about 0.5 to 20 m. In a particularly preferred embodiment, the decomposition vessel is a long column-type vessel wherein the inside diameter is about 0.04 to 2 m and the liquid height is about 2 to 15 m.

An inside diameter smaller than the inside diameter provided for within the present invention results in an increase in pressure loss and in the complexity of apparatuses and operations required. In addition, an increase in mixing in the vertical direction caused by chlorine gas bubbles results and effectively lowers the efficiency of decomposition. Conversely, if the inside diameter is larger than an inside diameter within the present invention there is increased mixing in the vertical direction and a resulting lowering of the efficiency of decomposition.

A liquid height in the decomposition vessel smaller than a liquid height within the present invention results in an increase in mixing of the liquid in the vertical direction and lowers the efficiency of decomposition. A liquid height in the decomposition vessel larger than a liquid height within the present invention increases equipment cost and complicates the operation.

If a larger liquid height is required, a plurality of decomposition vessels may be employed and connected in series and the chlorine gas produced therein is preferably separated and recovered in each of the decomposition vessels.

In another preferred embodiment, an ordinary tank-type of decomposition vessel may be employed and the reaction solution caused to flow upward. The degree of decomposition using a tank-type of decomposition vessel is somewhat lower than that achieved with a column-type vessel due to the increase in mixing of the solution in a vertical direction. In order to increase the degree of decomposition in a tank-type of decomposition vessel, the vessel is preferably partitioned along the liquid flow direction, namely in vertical direction, for example, by inserting pipes having the aforementioned inside diameter of a column-type of decomposition vessel, or by providing grid-type partition plates. In a preferred embodiment, each of the partitioned sections has a sectional area equivalent to that of the aforementioned column-type decomposition vessel, namely in the range of from 7 $cm^2$ to 7 $m^2$, more preferably from 12 $cm^2$ to 3 $m^2$, still more preferably from 12 $cm^2$ to 0.5 $m^2$. In this case, the height of the liquid layer in the decomposition vessel is preferably equivalent to that of the aforementioned column-type of decomposition vessel.

The upward flow velocity of the reaction solution is preferably in the range of from 0.3 to 40 m/hr, more preferably from 0.5 to 25 m/hr in the tank-type vessel as well as in the column-type vessel. This value is calculated from the volume of the reaction solution in the decomposition vessel and the flow rate of the reaction solution. An upward flow velocity greater than a velocity within the present invention increases pressure loss, and requires an increase in the length of the apparatus, with a resulting increase in apparatus cost and complexity of operation. An upward flow velocity less than a velocity within the present invention increases mixing in vertical direction and lowers the efficiency of decomposition.

In a particularly preferred embodiment, decomposition is conducted continuously and results in improved productivity and operability.

In a particularly preferred embodiment of the present invention, a process is provided wherein the reaction solution, comprising a salt solution and hydrochloric acid as described above, is maintained at an absolute pressure of not higher than 600 mmHg and not lower than the saturated vapor pressure of the solution in a decomposition vessel, and in addition, the reaction solution is introduced into a bottom portion of a decomposition vessel and caused to flow upward in the decomposition vessel.

If a tank-type of decomposition vessel is employed, hydrochloric acid is added to the salt solution at the same site, by the same method, and in the same amount as described for use with a column-type vessel. The internal pressure of the decomposition vessel is kept at an absolute pressure of not higher than 600 mmHg and not lower than the saturated vapor. In this embodiment, the reduced pressure combined with the upward flow in the decomposition vessel results in an unexpected improvement of the efficiency of decomposition of chlorate salt by hydrochloric acid.

In a preferred embodiment, pressure is maintained at a range not higher than 500 mmHg and not lower than 10 mmHg above the saturated vapor pressure of the reaction solution. In a particularly preferred embodiment, a warm-water ejector is employed which allows the ejected liquid-gas mixture to be introduced into a tank and subsequent recycling of the liquid phase to the ejector while the gas phase is separated and then dehydrated. The flow of liquid in the decomposition vessel is as described in the process solely utilizing upward flow of the reaction solution as a means of increasing decomposition efficiency. In this embodiment, chlorate salt is decomposed in a continuous process in order to improve the productivity and operability of the process.

In the present invention, the conditions for maintaining the reaction solution in the decomposition vessel are not particularly limited. The higher the temperature, the shorter the time required for decomposition of chlorate salts in the salt solution. The longer the holding time, the higher the decomposition ratio of chlorate salt. Usually, chlorate salts in the salt solution are sufficiently decomposed and removed at a temperature in the range of about 70° to about 100° C. with a holding time ranging from about 0.1 to about 3 hours.

Effective and efficient decomposition and removal of chlorate salts in salt solutions are achieved by employing a process within the present invention. In a preferred embodiment of the present invention, concentrations of chlorate salts ranging from about 2 to 50 g/l which have accumulated in salt solutions used for electrolysis can be readily lowered to a concentration ranging from about 1 to 30 g/l which is the concentration of chlorate salts normally employed in electrolysis. Accordingly, a process within the present invention can be effectively employed as a means for removing chlorates salts from the salt solutions employed in electrolysis.

Chlorate salts may be removed from salt solutions employed in electrolysis within the present invention at any site along the pipelines which return the salt solution from the electrolytic cell to a raw-salt dissolving tank or the pipelines which transport the salt solution from the dissolving tank after re-saturation with the raw salt to the electrolytic cell. In a particularly preferred embodiment of the present invention, chlorate salts are decomposed and removed from a salt solution that has been resaturated with alkali chloride and is being transported via the pipeline to the electrolytic cell. Owing to the high concentration of the salt solution at this location of the pipeline, decomposition of chlorate salts proceeds more rapidly. The choice of this location is advantageous in that the amount of hydrochloric acid required for the decomposition reaction can be decreased and deposition of salt is almost entirely eliminated.

In yet another preferred embodiment, decomposition and removal of chlorate salts are preferably conducted at a location of the pipeline where hydrochloric acid is added to the return salt solution and a portion of the salt solution is recycled to the electrolytic cell. This alternative is advantageous because the amount of the hydrochloric acid required can be further decreased and the salt solution is maintained at a high temperature. In either embodiment, it is understood that all of the salt solution may be treated or, alternatively, only a portion of the salt solution may be diverted through an additional pipeline and then treated with hydrochloric acid.

According to the present invention, chlorate salts are effectively and efficiently decomposed and removed from a salt solution and production of chlorine dioxide, a byproduct of this reaction, is decreased when a reaction solution comprising a chlorate-containing salt solution and hydrochloric acid is maintained at a pressure ranging from not higher than 600 mmHg to not lower than the saturated vapor pressure of the reaction solution in a decomposition vessel. The exact mechanism responsible for the unexpectedly superior results achieved by this process is unknown. However, if the pressure of the reaction vessel is not maintained within the range specified within the present invention hypochlorite salt may be formed as an intermediate in the decomposition reaction of chlorate salt and a simultaneous reverse reaction resulting in the formation of a chlorate salt from the hypochlorite salt may occur. Reduction of the pressure of the reaction solution may accelerate the conversion of hypochlorite salt to chlorine and may suppress the formation of chlorine dioxide.

In addition, chlorate salts are effectively and efficiently removed and the amount of chlorine dioxide formed as a byproduct is decreased when the reaction solution, prepared by adding hydrochloric acid to chlorate-containing salt solution, is caused to flow upward in the decomposition vessel. Although the reason for the unexpectedly superior results achieved by this process is un known, flowing the reaction solution upward suppresses mixing of the liquid in vertical direction and as a result, the undecomposed reaction solution is less likely to pass through the decomposition vessel without sufficient exposure to hydrochloric acid particularly when chlorine gas is generated. Consequently, there is a more uniform mixing of hydrochloric acid and chlorate salts and an acceleration of chlorate decomposition as well as a suppression of chlorine dioxide formation.

In summary, the present invention affords the following advantages.

(1) The amount of the hydrochloric acid required for the decomposition of chlorate salts in a salt solution can be decreased due to acceleration of the reaction by the reduced pressure in the reaction vessel. In addition, the post-treatment step of neutralizing excess hydrochloric acid by alkali is eliminated.

(2) Smaller apparatuses can be employed in a process within the present invention because chlorate salt decomposition proceeds more rapidly.

(3) Reducing pressure in the decomposition vessel also serves to remove chlorine gas from the salt solution. Therefore, a process within the present invention is advantageously combined with a process for purifying a salt solution used for electrolysis.

(4) Accumulation of chlorate salts in a circulating salt solution used for electrolysis is prevented. As a result, the conventional salt solution purge required to prevent accumulation of chlorate salts is not required, and electrolysis using salt solutions can be practiced in a completely closed system.

(5) The chlorate content of caustic alkali produced by slat solution electrolysis can be lowered, thereby resulting in an improvement in the quality of the caustic alkali product.

(6) Decomposition of a chlorate salt results in the production of chlorine gas and chlorine dioxide. A process within the present invention provides a lower ratio of chlorine dioxide to chlorine gas production which further provides for the more effective utilization of the chlorine gas byproduct as raw material utilized in the production of liquefied chlorine, synthetic hydrochloric acid, hypochlorite salts, and the like.

The results achieved using a process within the present invention are even more unexpectedly superior when the steps of maintaining the reaction solution under reduced pressure and causing the reaction solution to flow upward are employed simultaneously.

The present invention is further described below by reference to the following, illustrative examples which are not limitative of the remainder of the disclosure in any way whatsoever.

In the present invention, analysis of chlorate salts was conducted as follows. Ferrous sulfate ($FeSO_4$) was added in excess to the salt solution. After the mixture was boiled, the remaining ferrous sulfate was titrated with potassium dichromate ($K_2Cr_2O_7$) using barium diphenylaminesulfonate as the indicator. The chlorine dioxide in the chlorine gas produced was determined according to the method described in "Bosai Shishin (Guide to Hazard Prevention) II-8", page 6: "Bunseki Shiken Hoho" (Analysis Test Methods) edited by the Japan Chemical Society and published by Maruzen, Tokyo.

EXAMPLE 1

A return salt solution (containing NaCl: 209 g/l, and NaClO$_3$: 10.5 g/l) from a cation-exchange membrane electrolysis cell for aqueous sodium chloride, maintained at a flow rate of 5.3 l/hr, and aqueous 35% hydrochloric acid, maintained at a flow rate of 0.70 l/hr, were separately fed continuously to a 3-liter cylindrical decomposition vessel made of glass and equipped with a stirring blade. The temperature in the decomposition vessel was maintained at 80° C., and the solution mixture was stirred at a rate of 200 rpm to completely mix the reaction solution which was comprised of the salt solution and the hydrochloric acid. The absolute pressure in the decomposition vessel was maintained at 330 mmHg as the saturated vapor pressure of the reaction solution was 300 mmHg. The reaction solution which was fed at a constant flow rate was discharged continuously after the reaction. The concentration of sodium chlorate was determined every 30 minutes. After the reaction was continued for 15 hours, the resulting degree of decomposition of sodium chlorate was 78.3% at the stationary state.

EXAMPLE 2

Comparison

Sodium chlorate in a salt solution was decomposed as described in Example 1 above, except that the internal pressure of the decomposition vessel was maintained at atmospheric pressure. The resulting degree of decomposition of the sodium chlorate in the salt solution was 62.9% at the stationary state.

EXAMPLE 3

A return salt solution (containing NaCl: 198 g/l, and NaClO$_3$: 13.2 g/l) from a cation-exchange electrolysis cell for aqueous sodium chloride, maintained at a flow rate of 10.7 l/hr, and aqueous 35% hydrochloric acid, maintained at a flow rate of 2.41 l/hr, were fed continuously to the bottom portion of a cylindrical decomposition vessel made of glass, with an inside diameter of 42 mm and a height of 2700 mm and provided with a jacket. The temperature in the decomposition vessel was maintained at 80° C., and the internal pressure was maintained at atmospheric pressure. The reaction solution which was fed at a constant flow rate was discharged at a liquid height of 2400 mm, and the concentration of sodium chlorate therein was measured every 15 minutes. After the reaction was continued for 8 hours, the resulting degree of decomposition of the sodium chlorate was 77.5% at the stationary state.

EXAMPLE 4

Sodium chlorate in a salt solution was decomposed as described in Example 3 above, except that the internal pressure of the decomposition vessel was kept at 330 mmHg. The resulting degree of decomposition of sodium chlorate at the outlet of the decomposition vessel was 84.9% at the stationary state. The concentration of chlorine dioxide in the gas formed by decomposition of the sodium chlorate was not higher than 2% by volume. As a result, the chlorine gas produced by the reaction could be collected as liquefied chlorine.

EXAMPLE 5

A salt solution as employed in Example 3 above was maintained at a flow rate of 9.82 l/hr, and aqueous 35% hydrochloric acid, maintained at a flow rate of 2.14 l/hr, were separately fed continuously to a decomposition vessel as employed in Example 1 above. The temperature in the decomposition vessel was maintained at 80° C., and the solution mixture was stirred at a rate of 200 rpm in order to adequately mix the reaction solution which was comprised of the salt solution and hydrochloric acid. The absolute pressure in the decomposition vessel was maintained at 330 mmHg. The reaction solution was fed at a constant flow rate and was discharged continuously after the reaction. The concentration of sodium chlorate was determined every 15 minutes. After the reaction was continued for 8 hours, the resulting degree of decomposition of sodium chlorate was 76.2% at the stationary state.

EXAMPLE 6

Comparison

Sodium chlorate in a salt solution was decomposed as described in Example 5 above, except that the internal pressure of the decomposition vessel was maintained at atmospheric pressure. The resulting degree of decomposition of sodium chlorate in the salt solution was 55.4% at the stationary state. The concentration of chlorine dioxide in the gas formed by decomposition of the sodium chlorate was 5.4% by volume. Consequently the chlorine gas produced by the reaction could not be recovered as liquefied chlorine.

EXAMPLE 7

Comparison

Sodium chlorate in a salt solution was decomposed as described in Example 3 above, except that the reaction solution which was comprised of the salt solution and hydrochloric acid was fed to the top of the decomposition vessel and discharged from the bottom of the vessel. The resulting degree of decomposition of sodium chlorate in the salt solution was 49.8% at the stationary state.

EXAMPLE 8

A return salt solution (containing NaCl: 201 g/l, and NaClO$_3$: 12.1 g/l) from a cation-exchange membrane electrolysis cell for aqueous sodium chloride, maintained at a flow rate of 2.64 l/hr, and aqueous 35% hydrochloric acid, maintained at a flow rate of 0.66 l/hr, were fed continuously to the bottom portion of a decomposition vessel as described in Example 3 above. The temperature in the decomposition vessel was maintained at 70° C., and the absolute pressure therein was kept at 230 mmHg since the saturated vapor pressure of the reaction solution at 70° C. was 200 mmHg. The reaction solution was fed at a constant flow rate and was discharged continuously. The concentration of sodium chlorate therein was measured every hour. After the reaction continued for 13 hours, the resulting degree of decomposition of sodium chlorate was 82.3% at the stationary state.

EXAMPLE 9

Comparison

A salt solution as described in Example 8 above was maintained at a flow rate of 2.41 l/hr, and aqueous 35% hydrochloric acid at a flow rate of 0.60 l/hr was separately fed continuously to a decomposition vessel as described in Example 1 above. The temperature in the decomposition vessel was maintained at 70° C., and the solution mixture was stirred at a rate of 200 rpm to adequately mix the reaction solution which was comprised of the salt solution and hydrochloric acid. The absolute pressure in the decomposition vessel was maintained at 650 mmHg. The reaction solution was fed at a constant flow rate and after the reaction, was discharged continuously. The concentration of sodium chlorate was determined every hour. After the reaction was continued for 10 hours, the resulting degree of decomposition of sodium chlorate was 51.4% at the stationary state.

EXAMPLE 10

A return salt solution (containing NaCl: 203 g/l, and $NaClO_3$: 6.2 g/l) from a cation-exchange membrane electrolysis cell for aqueous sodium chloride, maintained at a flow rate of 29.9 l/hr, and aqueous 35% hydrochloric acid, maintained at a flow rate of 3.11 l/hr, were fed continuously to the bottom portion of a decomposition vessel as described in Example 3 above. The temperature in the decomposition vessel was maintained at 90° C., and the absolute pressure therein was maintained at 450 mmHg since the saturated vapor pressure of the reaction solution at 90° C. was 450 mmHg. The reaction solution was fed at a constant flow rate and discharged continuously. The concentration of sodium chlorate therein was measured every 10 minutes. After the reaction continued for 5 hours, the resulting degree of decomposition of sodium chlorate was 83.5% at the stationary state.

EXAMPLE 11

Comparison

A salt solution as described in Example 10 above, maintained at a flow rate of 27.2 l/hr, and aqueous 35% hydrochloric acid, maintained at a flow rate of 2.80 l/hr, were separately fed continuously to a decomposition vessel as described in Example 1 above. The temperature in the decomposition vessel was maintained at 90° C., and the solution mixture was stirred at a rate of 200 rpm in order to adequately mix the reaction solution which was comprised of the salt solution and hydrochloric acid. The pressure in the decomposition vessel was maintained at atmospheric pressure. The reaction solution was fed at a constant flow rate and discharged continuously after the reaction. The concentration of sodium chlorate was determined every 10 minutes. After the reaction was continued for 4 hours, the resulting degree of decomposition of sodium chlorate was 52.4% at the stationary state.

What is claimed is:

1. A process for removing chlorate salts from an aqueous alkali chloride solution employed in cation-exchange membrane electrolysis, the steps of
    adding hydrochloric acid to the aqueous alkali chloride solution directly resulting from said electrolysis to prepare a reaction solution;
    maintaining the absolute pressure of said reaction solution at a range not higher than 600 mmHg and not lower than the saturated vapor pressure of said reaction solution contained in a decomposition vessel;
    feeding said reaction solution through the bottom portion of said vessel; and
    causing said reaction solution to flow upward in said vessel.

2. A process according to claim 1, wherein said hydrochloric acid is added to said aqueous alkali salt solution in an amount ranging from 10 to 50 moles per mole of chlorate salt.

3. A process according to claim 1, wherein the upward flow of said reaction solution in said vessel ranges from 0.3 to 40 m/hr.

4. A process according to claim 1, wherein the upward flow of said reaction solution in said vessel ranges from 0.5 to 25 m/hr.

5. A process according to claim 1, wherein said absolute pressure of said reaction solution is maintained at a range not higher than 500 mmHg to not lower than 10 mmHg above the saturated vapor pressure of the reaction solution.

* * * * *